Sept. 8, 1953     A. M. McFARLAND     2,651,725
X-RAY CASSETTE HOLDER AND CLAMPING DEVICE
Filed March 24, 1951
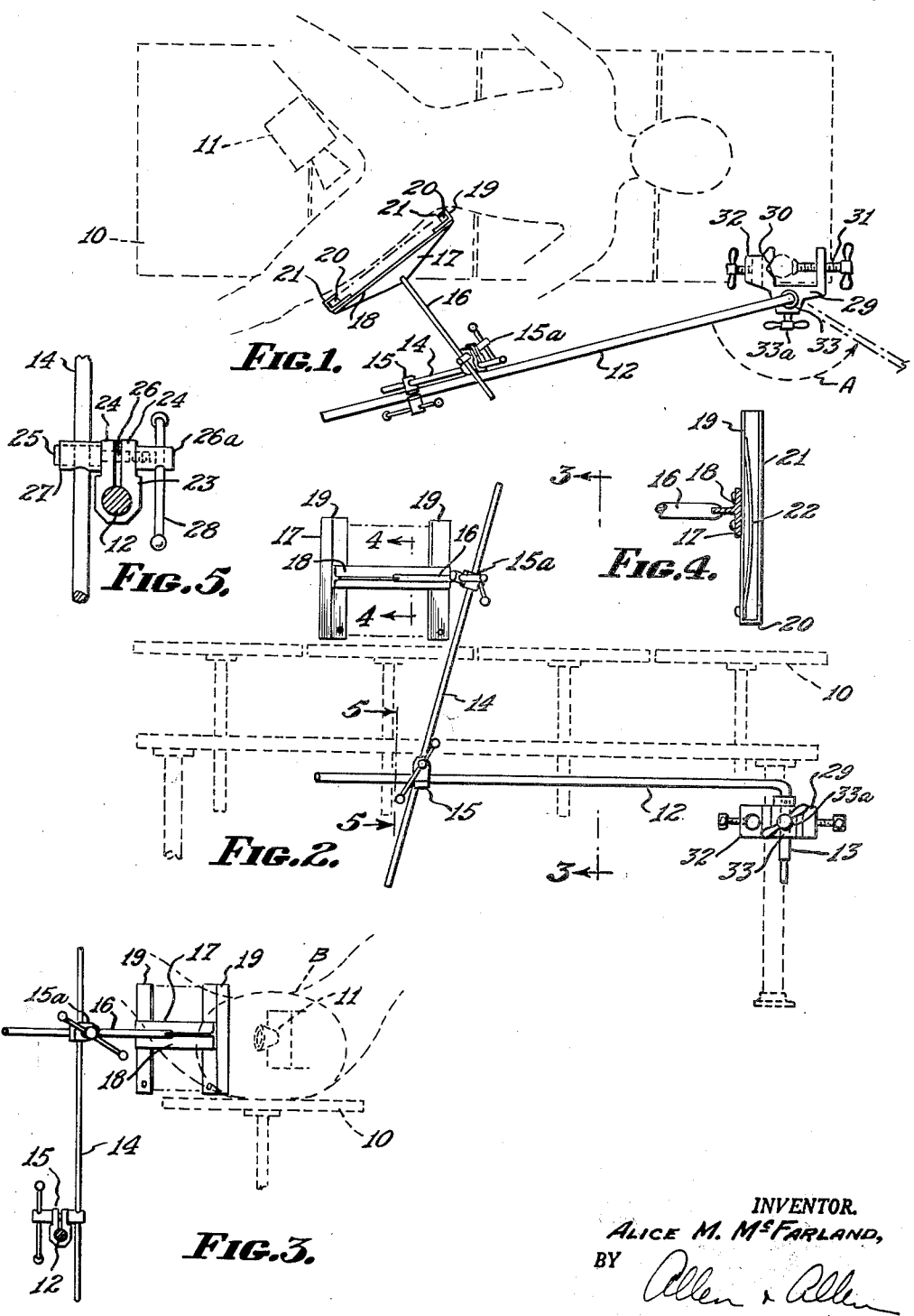
INVENTOR.
ALICE M. McFARLAND,
BY Allen & Allen
ATTORNEYS.

Patented Sept. 8, 1953

2,651,725

UNITED STATES PATENT OFFICE 2,651,725

X-RAY CASSETTE HOLDER AND CLAMPING DEVICE

Alice Margaret McFarland, Cincinnati, Ohio

Application March 24, 1951, Serial No. 217,344

3 Claims. (Cl. 250—58)

This invention relates to a device for holding and positioning an X-ray cassette during the progress of an operation and to certain clamping structures used in connection therewith, and is a continuation of my application Serial No. 138,419, filed January 13, 1950, now abandoned.

In certain surgical operations it is desirable before the operative field is made sterile to take an X-ray photograph with the film held in a certain position in relation to the patient's body. This is accomplished by placing an X-ray film in a light-tight cassette, which is then placed in the desired position in relation to the patient's fractured hip and the X-ray tube. During the course of the operation it may be desirable from time to time to take more X-ray photographs with the cassette positioned exactly as before. In the meantime however the operative field has been made sterile and the removal of the cassette, the changing of the film, and positioning of the cassette in its original position all subject the operative field to influences which would detract from its sterile condition; besides these manipulations interfere with the work of the surgeon and subject the technician who holds the cassette to the danger of overexposure to the X-rays.

In connection with operative procedures in cases of hip fractures the above described situation is particularly exhibited. According to one procedure, a patient having a hip fracture is placed upon the operating table and his lower extremities are held in clamping devices upon which tension may be exerted for the purpose of reducing the fracture. The surgeon will manipulate the hip and the tensioning devices until he believes that the fracture has been properly reduced. This preliminary work is done before the operative field is made sterile and when the surgeon believes that the facture has been properly reduced a number of X-ray photographs are taken. Usually one photograph is taken with the X-rays passing vertically through the hip region of the patient and another photograph is taken with the X-rays passing horizontally through the hip region of the patient. These films are immediately developed and examined by the surgeon to determine whether or not the fracture has been properly reduced. If the facture has been properly reduced, the surgeon then proceeds with the pinning operation. The field is made sterile and the surgeon inserts the first pin. At this point the surgeon may desire another X-ray photograph taken with the plate in exactly the same position as before in order that he may determine whether the pin has been properly placed. Thus, is he finds the pin has been improperly placed, he may remove the pin and reinsert it and then again may examine a succeeding X-ray photograph to determine the proper placement of the pin. After the field has been made sterile, great care must be exerted that no contaminated body approach the sterile area. In the past it has been the practice for the X-ray technician to hold the cassette covered with a sterile pillow case or the like in its desired position in relation to the pelvis of the patient. During the exposure the technician's hands have been exposed to the X-rays. The technician then had to step aside, remove the film from the cassette and proceed with its development, whereupon a new film had to be inserted in the cassette and this covered with a new sterile sheet to be again positioned as before by the technician.

The technician's activity has in the past interfered with the activity of the surgeon and has subjected the sterile operative field to the danger of contamination and has subjected the technician's hands to exposure to the X-rays.

With the foregoing considerations in mind, it is an object of the present invention to provide a device for holding an X-ray cassette containing a film in a desired position of adjustment, which holder may be swung out of the way so that a technician may manipulate the cassette and the X-ray film away from the surgeon's position and without danger of contaminating the sterile operative field.

It is a further object of the present invention to provide a device as outlined above which will be simple in construction and substantially foolproof in operation.

It is yet another object of the invention to provide a device which will be substantially universal in its application so that it may be used in connection with orthopedic tables of various types. In this connection it is another object of the invention to provide a universal clamping device for securing the device of the present invention to an orthopedic table. It is yet another object to provide an adjusting clamp for use in connection with the device.

These and other objects of the invention which will be pointed out in more detail hereinafter or which will be apparent to those skilled in the art upon reading these specifications, I accomplish by that certain construction and arrangement of parts of which I shall now describe an exemplary embodiment.

Reference is made to the drawings forming a part hereof and in which:

Figure 1 is a plan view of an orthopedic table showing a device according to my invention in use.

Figure 2 is a front elevational view of Figure 1.

Figure 3 is a transverse sectional view taken on the line 3—3 of Figure 2.

Figure 4 is a fragmentary cross sectional view taken on the line 4—4 of Figure 2, and Figure 5 is a fragmentary cross sectional view taken on the line 5—5 of Figure 2.

Briefly, in the practice of my invention I provide an arm positioned to move in a horizontal plane about a vertical pivot. I provide a second arm which may be clamped in relation to the first arm in any position of angular adjustment and at any point on either of said first or second arm. I then provide a third arm which may be clamped to said second arm in any desired position of angular adjustment and at any point on either of said second or third arms. Said third arm carries a cassette holder.

The cassette holder may thus be adjusted minutely to an exact position in relation to the patient to be X-rayed. The device may then be swung out of the way and after replacement of the cassette it may be swung back to an identical position.

Referring now in more detail to the drawings, an operating table has been indicated generally at 10 and an X-ray apparatus at 11. The main pivoting arm of the device is indicated at 12 and one end of the arm 12 is bent substantially at right angles as indicated at 13. If the operating table 10 is of suitable construction, a vertical hole may be bored in a portion of the operating table framework and the portion 13 of the arm 12 may be pivoted therein.

A second arm is indicated at 14 and by means of the clamping device indicated generally at 15 in Figures 1 and 2, the second arm 14 may be adjusted in relation to the first arm 12 so that the arms 12 and 14 are clamped together in any desired angular relationship and at any degree of extension of either arm.

A third arm is indicated at 16. The arm 16 is clamped to the arm 14 by means of a clamping device 15a which is identical with the clamping device 15. At one end of the arm 16 is provided the X-ray cassette holder indicated generally at 17 in Figures 1, 2 and 3. The holder 17 may simply comprise a cross member 18 which may have a T-shaped cross section and which may be welded or otherwise suitably secured to the end of the arm 16. At each end of the crosspiece 18 there is secured a side member 19 which side members may be identical and of opposite hand. Each of the said side members 19 preferably has a channel element 20 at the bottom to support the bottom of the plate and it preferably has a channel portion 21 along its side to support the edge of the cassette. A bow spring member 22 is preferably incorporated into each channel portion 21 so that the plates will be held in frictional engagement in the channels 21. The specific construction of the cassette holder member indicated generally at 17 does not form a feature of the invention and may be varied as desired.

The clamping members 15 and 15a of Figures 1 to 3 inclusive are shown in detail in Figure 5. In Figure 5 let it be assumed that the clamping member 15 is shown as viewed on the line 5—5 of Figure 2. This clamping device therefore clamps together the arm 12 and the arm 14. The clamping member comprises a generally U-shaped element 23 which has a bore of a size to embrace the arm 12. This clamping element is actuated by causing the arms 24 of the U to be pressed toward each other. A bolt 25 is provided having a portion 26 arranged to pass through holes in the arms 24 of the U-shaped member 23. The end of the bolt 25 passing through the arms is threaded as indicated in broken lines in Figure 5 so as to accept a nut 26a. The other end of the bolt 25 is provided with a hole to accept the arm 14. A sleeve 27 having an internal diameter to fit over the bolt 25 is also provided with a transverse hole to accept the arm 14. In assembly the arm 14 is caused to pass through the holes in the sleeve 27 and the bolt 25. The nut 26 may be provided with a hole through which passes a lever arm 28 by means of which a greater turning form may be imparted to the nut.

When the nut 26 is tightened it will be seen that the bolt 25 is drawn toward the right as well as the sleeve 27 bearing against one arm 24 of the U-shaped member 23. Thus the arms 24 of the U-shaped member 23 are compressed between the sleeve 27 and the nut 26. Furthermore the bolt 25 is drawn toward the right in relation to the sleeve 27 so that the arm 14 is clamped in shear between the bolt 25 and sleeve 27. When the nut 26 is loosened the connection of the clamp with both the arms 12 and 14 is freed. It will, of course, be understood that the clamp 15a may be identical with the clamp 15 just described.

In Figure 1, I have shown a clamp for use with the device of the present invention so that the device may be used with substantially any type of operating table. The clamp is constituted of a generally C-shaped member 29, one arm of which may be provided with the V notch 30 and the other arm of which is threaded for the passage of a screw 31. The member 29 is provided with two bosses indicated at 32 and 33. Each of the bosses 32 and 33 is provided with a bore of a diameter to accept the turned over portion 13 of the arm 12 and the holes in the bosses 32 and 33 are disposed at right angles to each other, one of the holes having its axis in a plane substantially the plane of the C-shaped member.

By virtue of the construction outlined above the clamp 29 may be clamped either to a horizontal or a vertical portion of the operating table and in either event a vertical hole is provided for the turned-over portion 13 of the arm 12. In Figures 1 and 2 the clamp member is shown as clamped to a vertical leg member of the operating table 10.

In use the clamps 15 and 15a are adjusted so that the cassette holder 17 is disposed in the exact position desired by the surgeon. A portion of the patient's anatomy is usually used as a locating point. Thus, for example, the cassette holder may abut the patient's lowest rib or the pelvic bone or the like. When the cassette holder is in the desired position the clamps 15 and 15a are tightened. This preliminary work is done before the operative field is made sterile, and a preliminary photograph may now be taken. The entire device is then swung away from the operating table over the arc indicated by the broken line arrow A in Figure 1. The X-ray technician may now remove the cassette containing the exposed X-ray film and substitute a cassette containing an unexposed film which may then be covered with a sterile sheet. Not only the cassette holder but preferably the entire unit, consisting of the cassette holder 17, the rod 16, the clamp 15a and the upper end of the rod 14 may be covered with a sterile sheet.

When the entire device is swung back to its original position the same portion of the cassette holder will abut the same spot determined upon as a locating spot on the patient's torso and thus the cassette will be returned to its identical position. Since the cassette has been changed at a considerable distance from the operative field and since a sterile sheet has been thrown over the entire portion of the unit which lies above the operating table there is no danger of contaminating the sterile operative field. The technician need not hold the cassette but may simply position it by means of the rear end of the arm 16 and may then, if desired, clamp it by means of the screw 33a. All adjustment time is eliminated and the surgeon need only step aside for a few seconds while the device is swung to its operative position and the exposures made. Thereupon the arm 12 is returned to the right and the surgeon may again step into his normal position.

In Figure 3 the cross section of the patient's pelvic region is indicated in broken lines at B, and the relationship between the cassette holder 17 and the X-ray tube 11 may be clearly visualized.

From the foregoing description it will be seen that a preliminary positioning of an X-ray cassette may be carried on before the operative field has been made sterile. Thereafter the operative field may be made sterile and the X-ray cassette and succeeding X-ray cassettes may be positioned in the identical position of the first cassette without the necessity of the technician being subjected to the X-rays and without unduly disturbing the operating surgeon. I have found that with a device according to the present invention the time required to perform the average operation in pinning a fractured hip may be reduced by about one-half. This of course reduces the danger to the patient and tends toward a speedier recovery while also generally helping to avoid post-operative complications.

It will be clear that numerous modifications may be made without departing from the spirit of the invention. Thus the device is useful not only in connection with operations for pinning hip fractures but for other operations as well. I therefore do not intend to limit myself in any manner other than as set forth in the claims which follow.

Having now fully described my invention, what I claim as new and desire to secure by Letters Patent is:

1. In combination with an operating table, a substantially horizontal arm pivotable with respect to said table about a vertical axis, a second arm, means for clamping said second and first arms together in any position of angular adjustment and at any point on either of said arms, a third arm, means for clamping said third and second arms together in any position of angular adjustment and at any point on either of said third or second arms, and an X-ray cassette holder on an end of said third arm, for the purpose described.

2. A device for use with an operating table, comprising a clamp having two pivot holes therein at right angles to each other, whereby a vertical pivot hole may be provided whether said clamp is secured to a horizontal or a vertical member on said operating table, a first arm having an end portion bent at right angles to the major portion thereof, said end portion being adapted to have pivotable engagement in said vertical pivot hole, a second arm, means for clamping said second and first arms together in any position of angular adjustment and at any point on either of said arms, a third arm, means for clamping said third and second arms together in any position of angular adjustment and at any point on either of said third or second arms, and an X-ray cassette holder on an end of said third arm, for the purpose described.

3. A device for use with an operating table, comprising a substantially horizontal arm capable of being mounted on such operating table for pivotal movement about an axis, a second arm, means for clamping said second and first arms together in any position of angular adjustment and on any point on either of said arms, a third arm, means for clamping said third and second arms together in any position of angular adjustment and at any point on either of said third or second arms, and an X-ray cassette holder on an end of said third arm, for the purpose described.

ALICE MARGARET McFARLAND.

References Cited in the file of this patent

UNITED STATES PATENTS

| Number | Name | Date |
| --- | --- | --- |
| 581,540 | Dennis | Apr. 27, 1897 |
| 1,440,401 | May | Jan. 2, 1923 |
| 1,721,271 | Du Prel | July 16, 1929 |
| 1,908,136 | Fox | May 9, 1933 |
| 2,220,725 | Moe | Nov. 5, 1940 |
| 2,343,846 | Robinson | Mar. 7, 1944 |